UNITED STATES PATENT OFFICE.

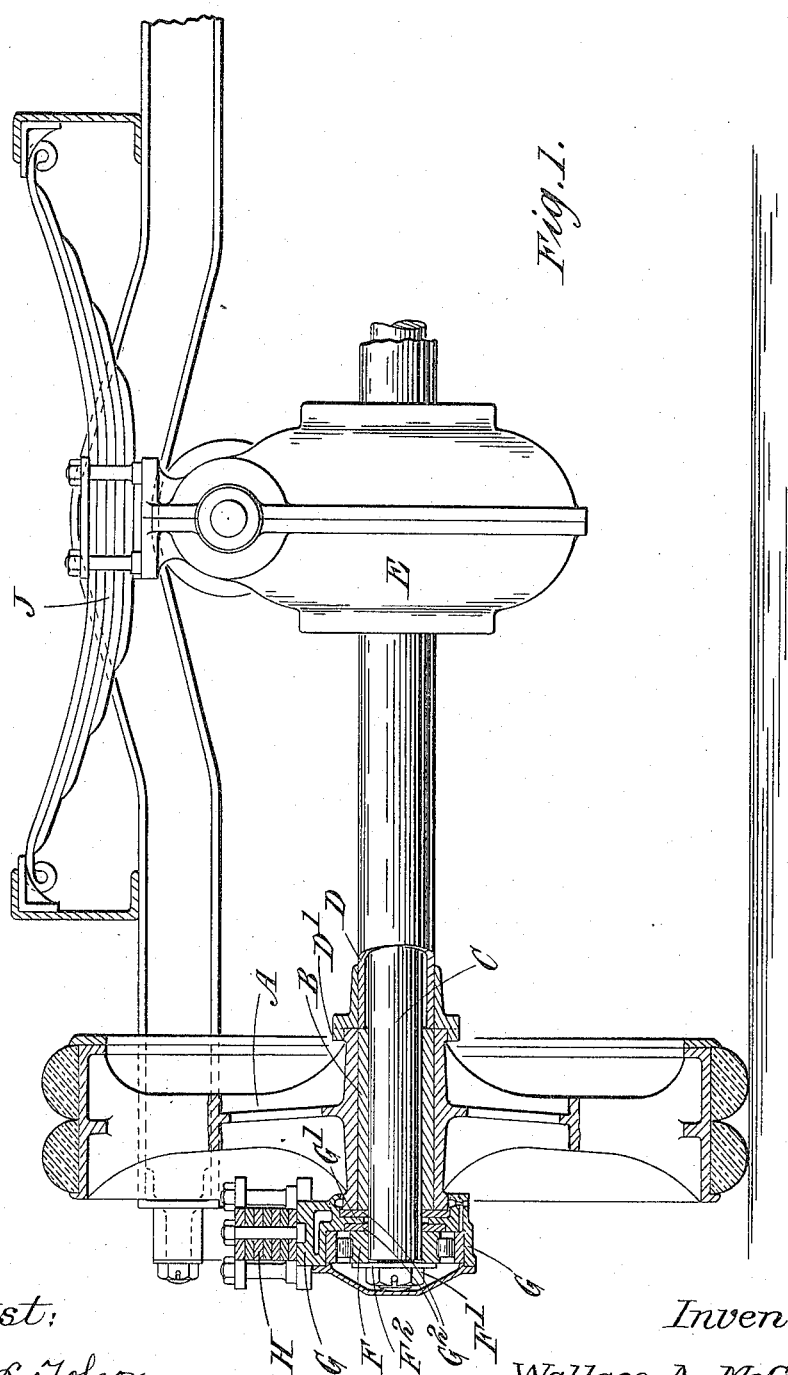

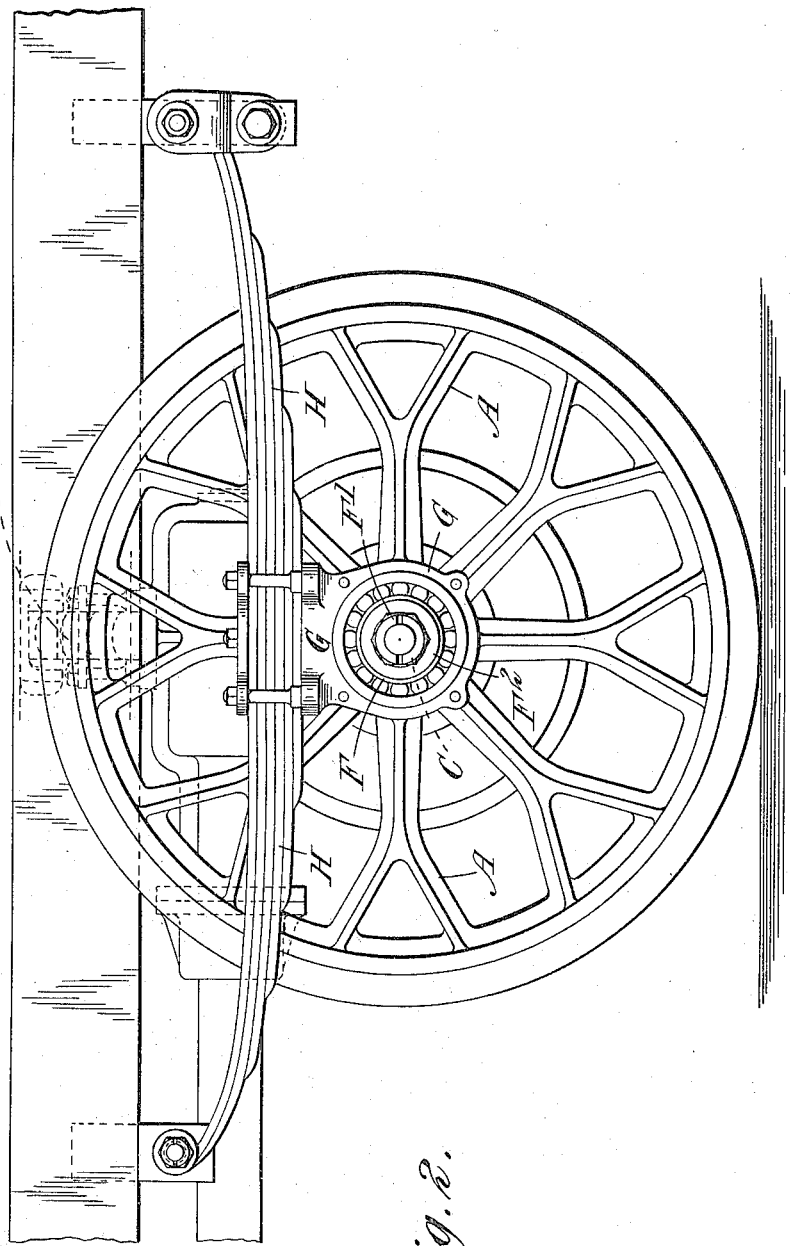

WALLACE ATHERTON McCURD, OF HAMPSTEAD, LONDON, ENGLAND.

CARRYING MEANS FOR THE ROAD-WHEELS OF VEHICLES.

1,164,203.  Specification of Letters Patent.  Patented Dec. 14, 1915.

Application filed November 2, 1914. Serial No. 869,973.

*To all whom it may concern:*

Be it known that I, WALLACE ATHERTON MCCURD, a subject of the King of England, residing at Hampstead, in the county of London, England, have invented certain new and useful Improvements in Carrying Means for the Road-Wheels of Vehicles, of which the following is a specification.

This invention is for improvements in or relating to the axles for the road-wheels of self-propelled vehicles. From the point of view of the strength of the axle it is desirable to provide a single rigid member extending between and carrying both the wheels, and it is the object of the present invention to provide a specific construction of axle of this type wherein several advantages, not hitherto obtained in such, are realized.

According to the present invention the means for supporting a road-wheel comprises a non-driving member whereon the road-wheel is free to rotate and a bearing on the frame outside the road-wheel for the non-driving member whereby such member is made to support the frame of the vehicle through the bearing and can itself rotate in such bearing.

This invention may be applied to the carrying means for the road-wheels of vehicles generally, but it is of particular advantage when applied to the driving-wheels of motor vehicles.

The invention will be described as applied to the live-axle type of motor vehicle having a central through axle or shaft which is not the driving-shaft and has no driving connection with any of the rotating parts.

One of the advantages obtained by the present invention is that it is possible to provide frictionless bearings, that is roller or ball-bearings, for the road-wheels of motor-vehicles, which are not excessively large; hitherto the use of such bearings has necessitated the use of very large hubs on the wheels, which rendered them heavier than was desirable, and also the ball-bearings themselves were large. The present invention renders it possible to use ball-bearings of a smaller size, without in any way increasing the weight of the wheel.

Another advantage is that this invention provides a duplicate set of bearings, for each wheel, so that although one bearing may seize or may be put out of action, the vehicle is not completely incapacitated, as the wheel can still run on the other bearing.

Another advantage obtained with this construction is that while a bearing is provided on the through-axle for the differential gear, motion only takes place in this bearing when the differential gear is operative, since the through-axle rotates normally with the wheels. There is therefore practically no relative motion between it and the differential, so that wear of this bearing is eliminated.

In the accompanying drawings:—Figure 1 shows partly in longitudinal section the mechanism of a live-axle-drive, and Fig. 2 is a side elevation of Fig. 1.

The road-wheels A, of which one is shown, are provided with bushes B forming the bearings for an axle C which extends through the differential to outside each of the road-wheels A. The drive is transmitted to the road-wheel A from the differential gear E by means of a sleeve D surrounding the axle C and engaging the road-wheel A by some convenient form of dog-clutch or toothed jaws $D^1$ or by flanges on the wheel and sleeve bolted together.

On the outer end of the axle C there is provided a roller-bearing F; the inner race-ring is in the usual manner a close fit on the axle C and is held in place on it by a nut $F^1$ screwed on the end of the axle, with a washer $F^2$. The outer race-ring is received in a bracket G and on this bracket are mounted the ordinary laminated springs H of the vehicle. These laminated springs may conveniently be attached to the frame of the vehicle.

The bracket G has a flange $G^1$ projecting inwardly toward the axle C between the roller-bearing F and the plain bearing B, and a thrust-washer $G^2$ is provided on each side of the flange $G^1$, so that end thrust in either direction is taken by the flange.

One of the advantages of the construction of live-axles hereinbefore described lies in the ease with which the parts may be assembled. When the differential gear has been mounted in position, the axle C is inserted through it and the sleeves D placed on to the axle and engaged with the differential. The wheels A are next slid on to the axle C and engaged by the clutch $D^1$ with its sleeve D, and then the bracket G with its thrust washer $G^2$ and roller-bearing F is placed in position on the end of the axle. When the nut F¹ with its washer F² has been screwed on to the end of the axle, all the parts are secured in position, it being understood that when the bracket G is threaded on to the axle C the ends of the laminated springs H are simultaneously secured on the frame of the vehicle.

Suitable covers and dust-excluding devices are provided on the bracket G to prevent the entry of foreign matter to the bearings.

The weight of the vehicle is applied to the axle C at its two ends and is supported by the road-wheels at two points intermediate of the ends. In order therefore to compensate for any tendency of the axle C to bend upward in the middle, a laminated spring J may be provided upon the casing of the differential between it and the frame of the vehicle so that the axle C is maintained straight.

It will be seen that in the normal operation of this axle, the member C rotates with the road-wheels and with the wheels of the differential gear which are coupled to the sleeves D. Very little wear takes place between these two parts with consequent increased life of these parts.

What I claim as my invention and desire to secure by Letters Patent is:—

1. In carrying-means for the road-wheels of vehicles, the combination of, a road-wheel, two independent bearings arranged side by side, one in the wheel and the other in a part carried by the frame of the vehicle, a non-driving member which extends through both bearings, constitutes a support for that bearing carried from the frame, and is itself supported by that bearing within the wheel whereby each of the two said bearings takes the whole load of that part of the vehicle which is carried by the wheel to which the bearings are allotted in order that should one bearing become inoperative the wheel can still rotate relatively to the vehicle frame by reason of the other bearing.

2. In carrying-means for the road-wheels of vehicles, the combination of, a road-wheel, a vehicle-frame, an anti-friction bearing situated outside the wheel but close thereto and carried from the vehicle frame by readily detachable means, a second bearing in the wheel in line with the first mentioned bearing and a non-driving member which extends through the bearing in the wheel and projects a short distance beyond into the anti-friction bearing whereby each of the two bearings is made to take the whole load of that part of the vehicle which is carried by the wheel to which the bearings are allotted in order that should one bearing become inoperative the wheel can still rotate relatively to the vehicle frame by reason of the other bearing and the outside bearing can be removed and replaced without disturbing the wheel.

3. In carrying-means for the road-wheels of vehicles the combination of two road-wheels, two independent bearings for each wheel arranged side by side, one in each wheel and the others in parts carried by the frame of the vehicle, a non-driving member which extends through all the said bearings, constitutes a support for the bearings carried from the frame and is itself supported by the bearings within the wheel whereby each of the said bearings takes the whole load of that part of the vehicle which is carried by the wheel to which the bearings are allotted in order that should one bearing become inoperative the wheel can still rotate relatively to the vehicle frame by reason of the other bearing.

4. In carrying-means for the road-wheels of vehicles, the combination of, a road-wheel, a vehicle frame, an anti-friction bearing situated outside the wheel but close thereto and carried from the vehicle frame by a laminated spring, a second bearing in the wheel in line with the first mentioned bearing and a non-driving member which extends through the bearing in the wheel and projects a short distance beyond into the anti-friction bearing whereby each of the two bearings is made to take the whole load of that part of the vehicle which is carried by the wheel to which the bearings are allotted in order that should one bearing become inoperative the wheel can still rotate relatively to the vehicle frame by reason of the other bearing and the outside bearing can be removed and replaced without disturbing the wheel.

In testimony whereof I have signed my name to this specification in the presence of two subscribing witnesses.

WALLACE ATHERTON McCURD.

Witnesses:
HARRY B. MIDGE,
ALFRED J. COWING.

Copies of this patent may be obtained for five cents each, by addressing the "Commissioner of Patents, Washington, D. C."